United States Patent [19]

Dupillier

[11] Patent Number: 5,119,418
[45] Date of Patent: Jun. 2, 1992

[54] TELEPHONE SYSTEM WITH SEVERAL TERMINALS ON A SINGLE LINE

[75] Inventor: Christian Dupillier, Grenoble, France

[73] Assignee: Dolphin Integration, Meylan, France

[21] Appl. No.: 703,657

[22] Filed: May 21, 1991

[30] Foreign Application Priority Data

May 22, 1990 [FR] France .................. 90 06606

[51] Int. Cl.⁵ .............. H04M 1/54; H04M 1/64; H04M 1/72; H04M 9/02
[52] U.S. Cl. .................. 379/373; 379/383; 379/386; 379/418; 379/442
[58] Field of Search ............ 379/184, 373, 372, 383, 379/386, 418, 442

[56] References Cited

U.S. PATENT DOCUMENTS

| | | | |
|---|---|---|---|
| 3,688,038 | 8/1972 | Hugyecz et al. | 379/372 |
| 4,367,376 | 1/1983 | Proctor et al. | |
| 4,415,774 | 11/1983 | Driver | 379/372 |
| 4,653,089 | 3/1987 | Eydelman | |
| 4,975,940 | 12/1990 | Hashimoto | 379/442 X |

FOREIGN PATENT DOCUMENTS

FR2600849 12/1987 France .

OTHER PUBLICATIONS

J. Fitzpatrick, "E.R.—An Electronic Telephone Receptionist," *Speech Technology*, Feb./Mar. 1985, pp. 105–107.

*Primary Examiner*—Stafford D. Schreyer
*Attorney, Agent, or Firm*—Lowe, Price, LeBlanc & Becker

[57] ABSTRACT

In a telephone system, several telephone terminals are connected to a single telephone line including several telephone interface circuits (6, 7, 8), each interface circuit being energized by ringing signals appearing on the line and being arranged between the telephone line (3) and one of the telephone terminals (13, 14, 15, 16), the ring of which is disconnected from the line. Each interface circuit comprises a circuit (26) for counting ringing signals and picking up the line, this first circuit receiving at the input the ringing signals appearing on the line (L1-L2) during a telephone call, and counting a predetermined number of these ringing signals, then picking up the line by a relay (27) at the moment the last ringing signal counted stops. The system is powered only by the signals on the telephone line.

8 Claims, 3 Drawing Sheets

TELEPHONE SYSTEM WITH SEVERAL TERMINALS ON A SINGLE LINE

BACKGROUND OF THE INVENTION

The present invention relates to a telephone system designed to be installed at the home of a subscriber who has only one telephone line. The invention more particularly relates to a telephone system comprising several telephone terminals liable to be connected to the single subscriber's line, the functions of this system being to automatically answer a telephone call and to automatically exchange information with the calling party so as to route him to one of the telephone terminals he has selected.

In some telephone interface systems, a device of the telephone answering set type allows picking up the line which amounts to hooking off a telephone handset, further to a telephone call, then to recognize an additional dialling signal emitted on the line by the caller and to consequently switch the telephone line to a desired terminal. To achieve such a function, a telephone interface circuit, arranged between the telephone line and a terminal, is provided to pick up the line in response to a ringing signal, so as to then receive the additional dialling number emitted by the caller, then to generate an action, for example a ring, at the desired telephone terminal.

When installing such a system at a subscriber's home, it is necessary to modify the connection of the telephone terminals on the line so that these terminals do not ring during a telephone call. Indeed, it is the telephone interface circuit that receives the call and then sends a specific ring tone only to the selected terminal. Therefore, the ring of the terminals is inhibited and replaced by a specific ring controlled by the interface circuit, which requires the installation of additional electric connections connecting the interface circuit to each of the specific rings arranged at the terminals.

To avoid installing these additional electric connections, a first known system sends modulated signals to at least one of the wires of the telephone line that connects the various terminals. Thus, some wires of the telephone line are used for a function other than that determined by the telephone network company. But, it may happen that the telephone company does not authorize such a modification of the telephone line connections, even at the subscriber's home.

Another system is described in U.S. Pat. No. 4,653,089 patent but this system requires the use of a specific circuit incorporating a hold coil for imposing a specific voltage level on the line while waiting for additional diallings, and an electric power source.

SUMMARY OF THE INVENTION

An object of the invention is to provide a telephone system comprising several terminals, which functions as a telephone answering system and as an automatic switch towards a terminal selected by the caller, without using additional electric connections and without using the line wires for a function other than the one initially provided.

Another object of the invention is to provide a telephone system which does not need any additional electric current supply, the whole electric supply of the system being taken from the telephone line, while respecting the limits authorized by the telephone company, that is, this system is a remote-powered apparatus.

The invention then relates to a telephone system comprising several telephone terminals on one line, including several telephone interface circuits, each interface circuit being fed by ringing signals appearing on the line, being arranged between the telephone line and one of the terminals, the ring tone of which is disconnected from the line, and comprising a first means for detecting the ringing signal appearing during a telephone call.

According to the invention, each interface circuit comprises a first remote powered circuit (that is, a circuit drawing the current necessary for its operation from the telephone line) for counting ringing signals and picking-up the line, this first circuit receiving the ringing signals appearing on the line during a telephone call, being fed by the ringing signals and counting a predetermined number of these ringing signals, then picking-up the line at the instant the last ringing signal, thus counted, stops.

According to an embodiment of the invention, the system comprises one main interface circuit and at least one secondary interface circuit. The main interface circuit comprises an answering circuit comprising a speech synthesizer activated after the line pick-up for sending on the line words asking the caller to dial one of additional call numbers designed for one of the selection circuits.

According to an embodiment of the invention, the answering circuit further comprises means for emitting words designed to the caller, in response to a number sent by the caller, in order to acknowledge receipt of this call.

According to an embodiment of the invention, the answering circuit comprises a memory constituting a letter box for storing a message or the telephone number of the calling party, in case nobody hooked off the called telephone terminal, further to the ring tone.

According to an embodiment of the invention, each interface circuit comprises means for detecting hooking off of the corresponding telephone terminal; emitting a determined frequency in the line as soon as this telephone terminal is hooked off; detecting the presence of such a frequency from another interface circuit; and disconnecting the line in response to the occurrence of this frequency, whereby, when one of the interface circuits detects the hooking off of the corresponding terminal, it sends the determined frequency to the line, thus causing disconnection of all other interface circuits.

In a telephone system according to the invention, several interface circuits are used, one for each telephone terminal, which operate independently one with respect to the other and pick up the line quasi simultaneously in response to a telephone call. Each interface circuit has its own ringing system that it operates only when necessary. Therefore, it is not necessary to remotely control this ringing system and, consequently, to have specific electric connections between the various terminals for controlling such ringing systems. Besides, the various interface circuits comprise means allowing them to exchange information so as to get synchronized, this information being constituted by determined frequency signals sent through the telephone line.

BRIEF DESCRIPTION OF THE DRAWINGS

The foregoing and other objects, features and advantages of the invention will be apparent from the following detailed description of a preferred embodiment as illustrated in the accompanying figures wherein.

DETAILED DESCRIPTION OF THE INVENTION

Figure 1:
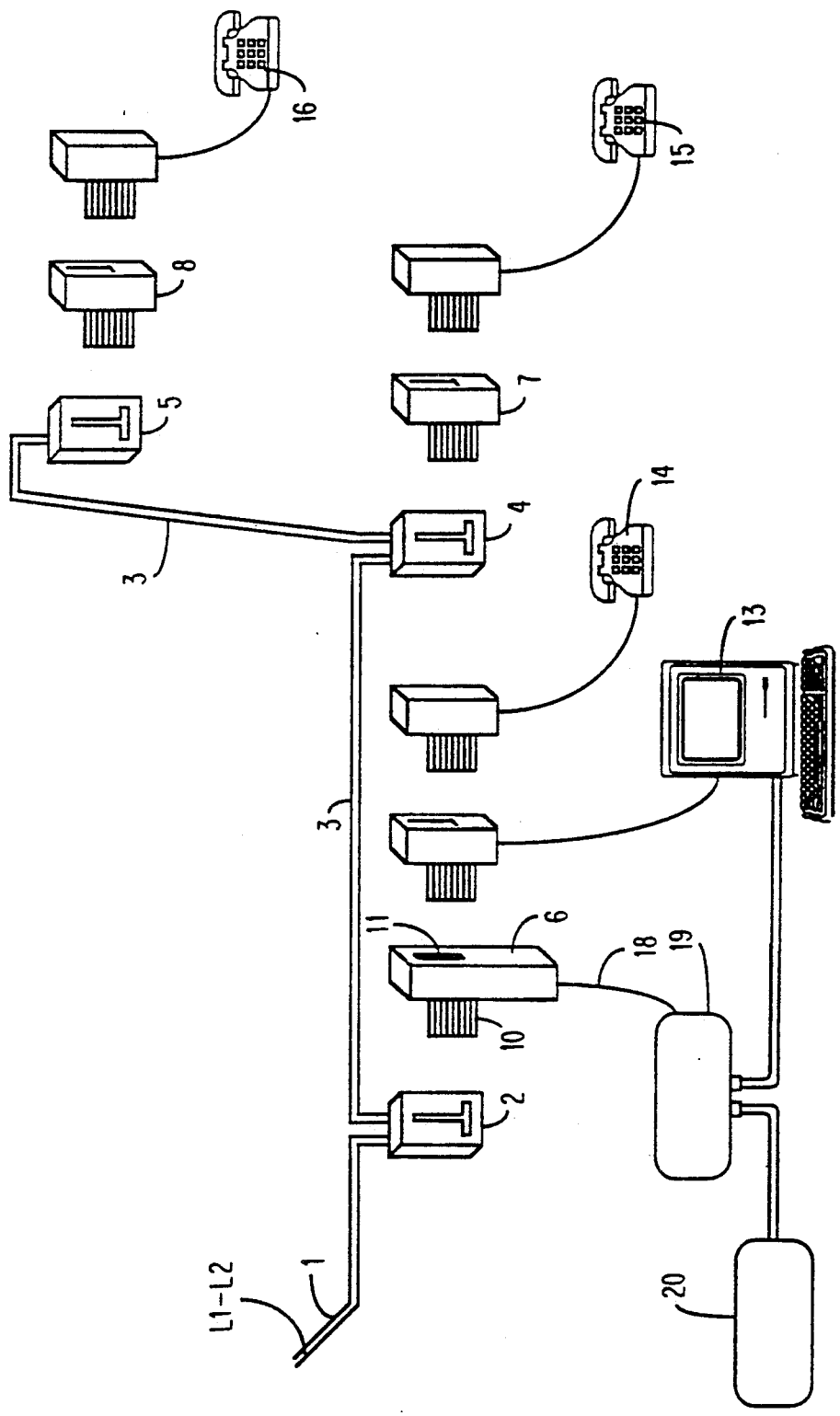
FIG. 1 schematically shows the general arrangement of a telephone system according to the invention.

FIG. 1 shows an assembly of devices which are installed at a subscriber's home, this assembly constituting, with the portion of the subscriber's line installed within the home, a telephone system according to the invention. The subscriber's line comprising a pair of wires L1-L2 comprises a portion 1 from the telephone network and arriving at the subscriber's home entrance to a first telephone jack 2. Line L1-L2 extends in the subscriber's home along a portion 3 on which are arranged a plurality of jacks 4, 5. On the various jacks 2, 4 and 5, the subscriber can connect the telephone terminals he desires, in the order that suits him, this order having no influence on the system operation since all jacks are parallel-connected. On one of the jacks 2, a main interface circuit 6 is connected and on the other jacks 4, 5, secondary interface circuits 7, 8, of identical design, are connected. The telephone system therefore comprises one main interface circuit and one or several secondary interface circuits. Each main or secondary interface circuit 6, 7, 8 comprises a male connector 10 for connection to a jack and a female connector 11 for connecting the line with a telephone terminal. Therefore, the interface circuit is interposed between the subscriber's line and a terminal.

Various telephone terminals can be connected to the various interface circuits. By way of example, on the main interface circuit 6 is illustrated a teletext transmission apparatus 13 as well as a conventional telephone set 14, and on the secondary interface circuits 7, 8 are illustrated conventional telephone sets 15, 16.

On the main interface circuit 6, it is further provided, by way of example, to connect through a specific connection 18 a routing circuit 19 operating either the teletext apparatus 13 or another automatic apparatus 20 for controlling or monitoring a domestic equipment, in response to telephone transmitted information.

When line L1-L2 is called, this causes the occurrence of trains of alternative signals conventionally designed to activate a telephone ring. Each interface circuit 6, 7, 8 comprises means for detecting this series of ringing signals. This means counts a number N of ringing signals supplied by the telephone line, and picks up the line at the end of the $N^{th}$ ringing signal. In practice, this predetermined number N of signals will be equal to two or to three.

Each interface signal draws its electric power from the ringing signals. Conventionally, a call signal comprises series of ringing signals. Each signal, of about 1.5 seconds, comprises several alternations of a 50-Hz alternative signal of a relatively high voltage, for example 48 peak to peak volts, applicable to a telephone set having a determined impedance (5 k$\phi$) Since each interface circuit picks up the line after a determined number of ringing signal trains, the invention provides to store, for example in a relatively high value capacitor, a sufficiently high electric power for activating a line pick up relay.

Figure 2:
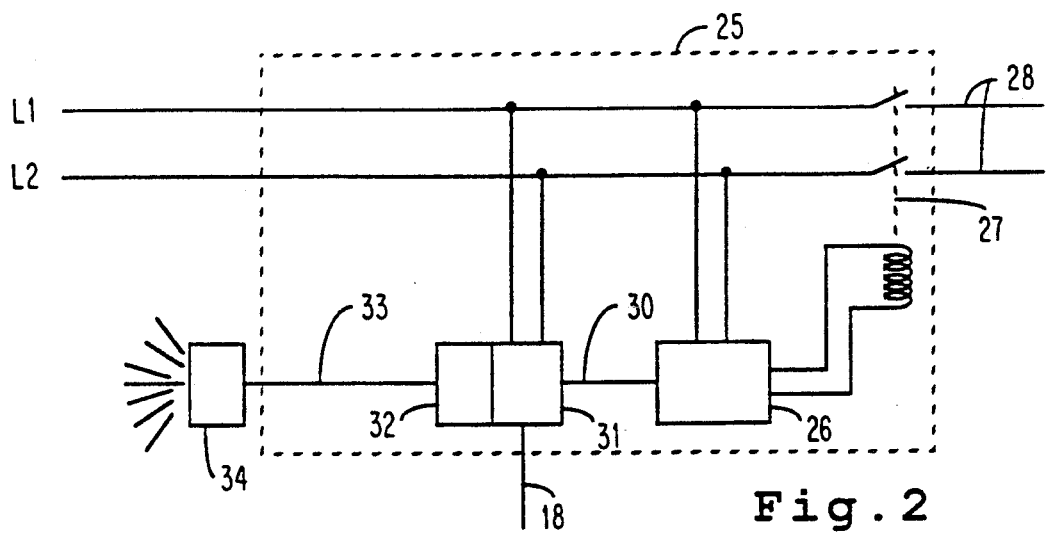
FIG. 2 is a block diagram showing the general arrangement of a main interface circuit used in a system according to the invention.
Figure 3:
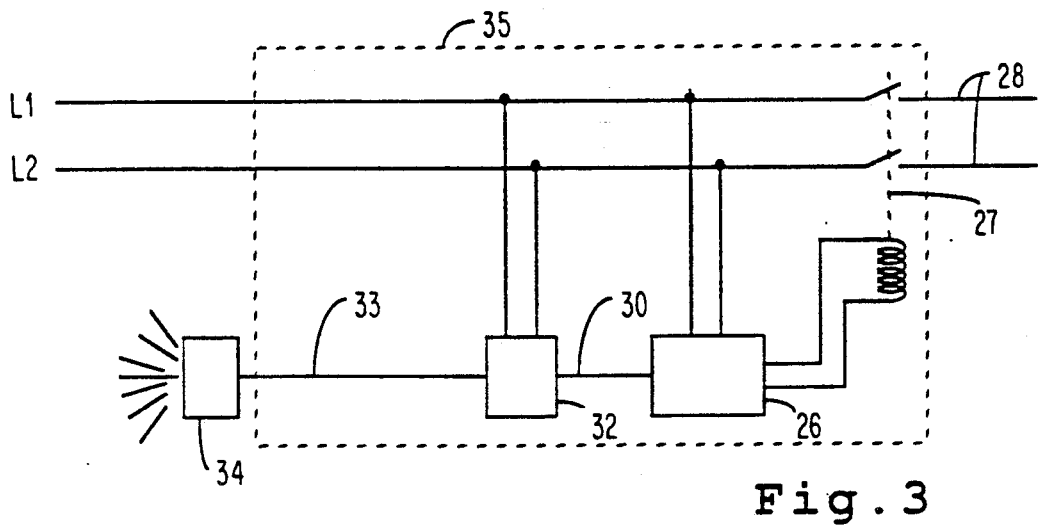
FIG. 3 is a diagram showing the general arrangement of a secondary interface circuit used in a system according to the invention.

FIGS. 2 and 3 schematically show the various functions of the main and secondary interface circuits, respectively.

In FIG. 2, the electronic circuit 25 of the main interface circuit 6 comprises a circuit 26 connected to wires L1 and L2 of the telephone line for counting ringing signals and picking up the line. Circuit 26 counts the N first ringing signals, for example the first 2, appearing during a call and electrically activates a switch 27 just at the time the $N^{th}$ ringing signal stops, in order to pick up the line to be used by a telephone terminal (not shown) connected to the output 28. When circuit 26 picks up the line, it sends a signal through a connection 30 to an answering circuit 31 which is designed to establish vocal sequences allowing to communicate with the caller for asking him to dial a number designating one of the telephone terminals. If the caller sends to the line a number corresponding to the one, permanently stored in a selection circuit 32, of the terminal connected to this interface circuit, circuit 32 sends to a line 33 an electric signal activating a ring 34, the sequences of which imitate a conventional telephone call ring. Ring 34 can be a high efficiency acoustic transducer. The subscriber can also send to the line another code corresponding to the connection of this subscriber directly with a specific automatic device constituted, for example, by a teletext communication apparatus 13 or by any automatic apparatus 20.

Circuit 31 can ensure various exchanges of automatic vocal information with the caller. For example, circuit 31 can include a memory circuit constituting a letter box storing a message or the telephone number of the caller, in case nobody hooked off the called telephone terminal further to the call. Circuit 31 can also use the vocal synthesizer for transmitting vocal signals to the caller, in response to a number sent by the caller, to acknowledge receipt of this call and to allow the caller to check if he sent the right number.

FIG. 3 shows the electronic circuits 35 of a secondary interface circuit 7, 8. Circuit 35 comprises substantially the same components as circuit 25, the components with the same functions in these two circuits having the same references. Circuit 35 is distinguished from circuit 25 only by the fact it does not include the answer circuit 31. The circuits 26 for counting ringing signals and picking up the line being identical in the main and secondary interface circuits, they pick up the line quasi simultaneously. The main interface circuit is then the only one to send information to the caller through circuit 31. Then, circuits 32 present in all the interface circuits operate to determine which telephone terminal is selected by the caller when the latter dials an additional number.

Figure 4:
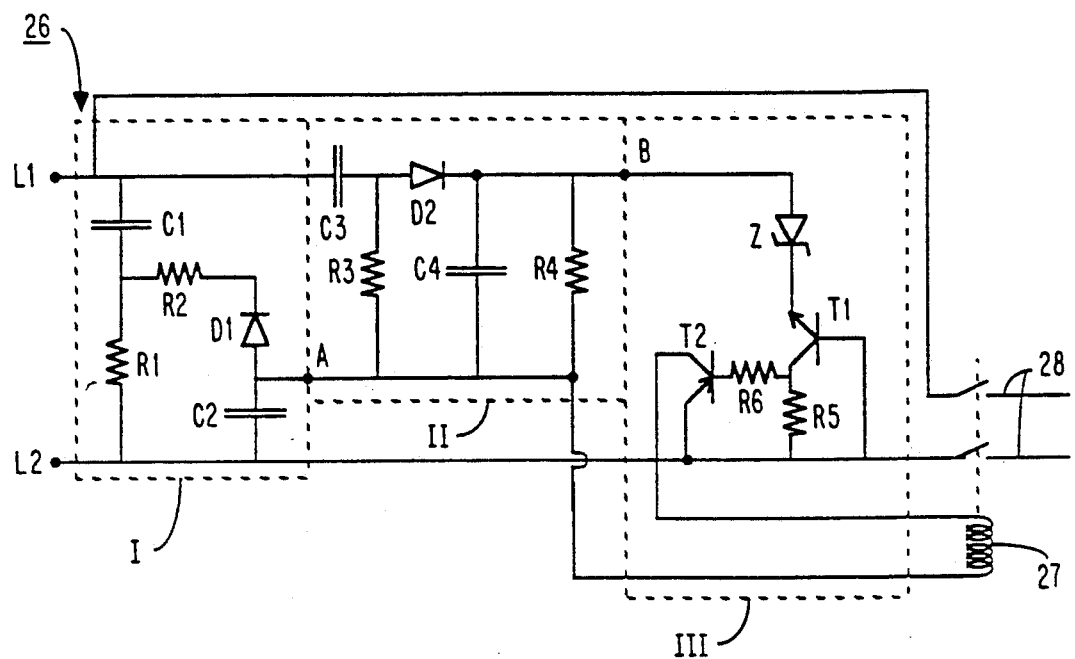
FIG. 4 is a diagram of an embodiment of the remote-powered circuit of an interface circuit according to the invention.

FIG. 4 shows an exemplary implementation of the circuit 26 for counting ringing signals and picking up the line. Circuit 26, connected to the pair of telephone wires L1 and L2, comprises three parts, namely, a storage circuit I, an offset circuit II and a triggering circuit III.

The storage circuit I comprises, between wires L1 and L2, a capacitor C1 in series with a resistor R1. In parallel on resistor R1 is arranged the series connection of a resistor R2, a diode D1 and a capacitor C2. Diode D1 is conductive along the direction of wire L2 towards wire L1. The junction between capacitor C2 and diode D1, which forms the output of this storage circuit I, is referenced A.

The offset circuit II is connected between wire L1 and point A between which are arranged in series a capacitor C3 and a resistor R3. In parallel on resistor R3, are connected in series a diode D2 and a capacitor C4. In parallel on capacitor C4 is connected a resistor R4. Diode D2 is conductive from wire L1 towards wire L2 (wire L1, capacitor C3, diode D2, capacitor C4, capacitor C2, wire L2). The junction of diode D2 and capacitor C4 is referenced B.

The triggering circuit III is arranged between point B and wire L2 between which are connected in series a zener diode Z, an NPN transistor T1 and a resistor R5. The base of transistor T1 is connected to the wire L2 and the collector of transistor T1 is connected to the base of a PNP transistor T2 through a resistor R6. This transistor T2 is connected in series with the pulse relay coil 27 (see FIGS. 2 and 3) between point A and wire L2.

Figure 5A:
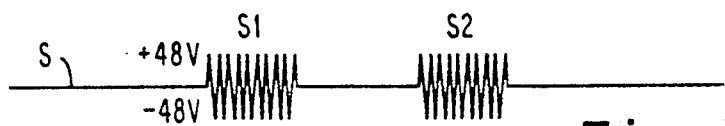
FIGS. 5A–5C are a chronogram of some signals of the diagram of FIG. 4.
Figure 5B:
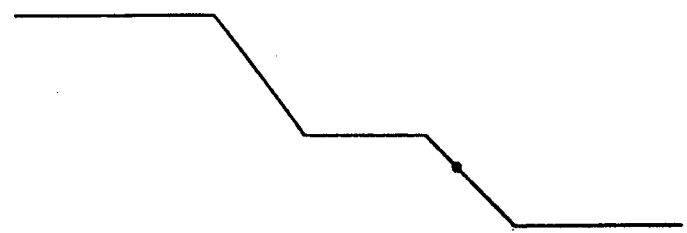
Figure 5C:
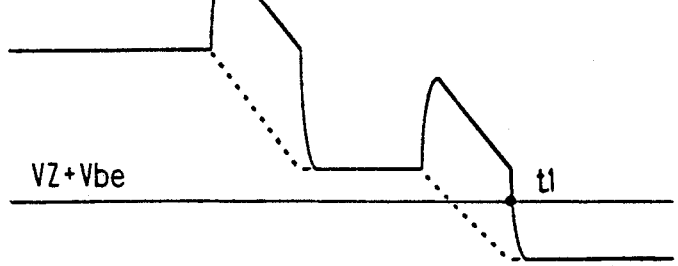

The operation of the circuit shown in FIG. 4 will be explained in relation with FIGS. 5A-5C among which FIG. 5A shows the calling signal S, this signal being formed by a series of ringing signals (S1, S2), FIG. 5B shows the voltage at point A, and FIG. 5C shows the voltage at point B.

In the storage circuit I, the capacitor with the highest value is capacitor C2 which is designed to store power for activating relay 27. Resistor R2 is selected so that the charging time constant of capacitor C2 is substantially higher than the duration of a ringing signal (S1, S2). Thus, as shown by FIG. 5B, capacitor C2 is progressively and negatively charged during each ringing signal train.

The offset circuit II essentially comprises a capacitor C4 which is very quickly charged (by the path C3, D2, C4, C2) during the first positive half-wave of a ringing signal. Between the ringing signals, capacitor C4 is discharged in resistor R4. The time constant C4-R4 is selected so that this discharge is relatively quick and corresponds to the duration of a few half waves of the ringing signal so as to avoid discharging during the negative half-waves between two positive half-waves.

Thus, as shown by FIG. 5C, as soon as a ringing signal arrives, the voltage at point B very quickly increases under the influence of the immediate charge of capacitor C4, then progressively decreases under the influence of the slower charge of capacitor C2. At the end of the ringing signal, capacitor C2 maintains its charge and capacitor C4 is rapidly discharged in resistor R4.

The triggering circuit III detects the moment at which the voltage at point B becomes higher in absolute value than the sum of the voltage drops in zener diode Z and in transistor T1 (VZ+VBE). As shown in FIG. 5C, this event necessarily occurs at a time t1 taking place soon after a ringing signal. Then, transistor T2 becomes conductive and capacitor C2 is discharged in coil 27.

There may be some differences in the operation of the various interface circuits, which implies that all these circuits will not simultaneously pick up the line. This causes no malfunction because, when one of the interface circuits picks up the line slightly before the other circuits, this first connection to the line quasi immediately causes interruption of the ringing signal, which quasi immediately triggers the other interface circuits.

By way of example, it is possible to select for the main circuit capacitors the following values:

| capacitor C1 | 1.5 μF |
|---|---|
| capacitor C2 | 100.0 μF |
| capacitor C3 | 0.47 μF |
| capacitor C4 | 4.7 μF |

The value of resistor R1 is selected for providing an adequate matching of the line impedance.

Thus, circuit 26 is a remote-powered circuit causing the line to be picked up after a predetermined number of ringing signals.

Figure 6:
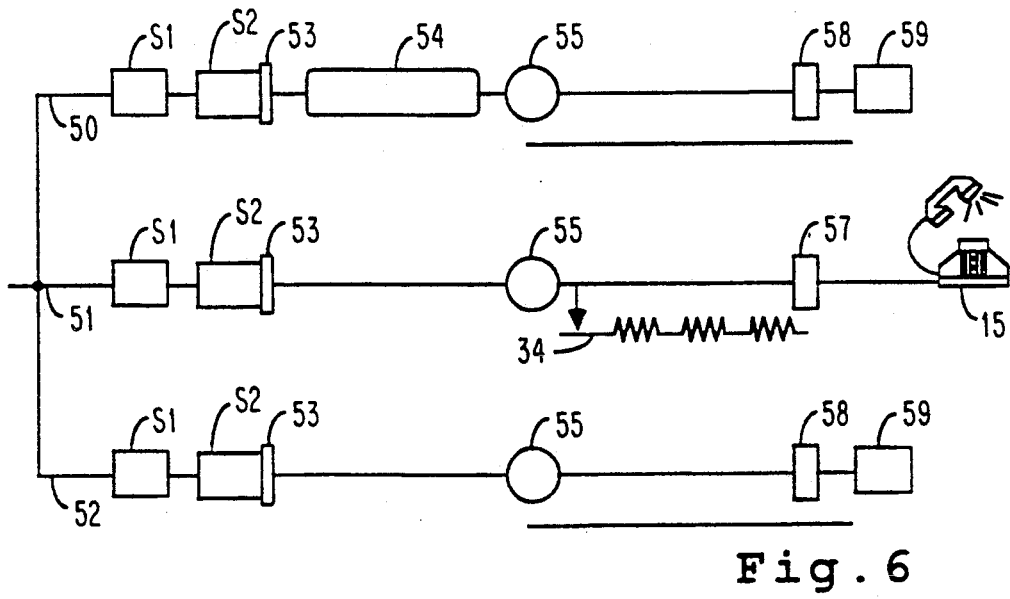
FIG. 6 is a diagram showing a possible operating mode of a system according to the invention.

FIG. 6 is a diagram illustrating a possible implementation of the telephone system according to the invention. Lines 50, 51 and 52 show the chronology of events in the main interface circuit 6 and in the secondary interface circuits 7 and 8, respectively. Events occurring at the same instant in several of these lines are drawn on a same vertical line.

First, all the interface circuits receive the first ringing signal S1, then the second ringing signal S2. At the end of the ringing signal S2, all the interface circuits simultaneously pick up the line (heavy line 53). Then, the main interface circuit sends into the line a vocal information (54), afterwards, all the interface circuits simultaneously receive an additional number sent by the caller (circle 55). In this example, the secondary interface circuit corresponding to line 51 recognizes its own number and controls its ring 34. This secondary interface circuit then detects the hooking off of its terminal 15 and sends to the line a signal (represented by the rectangle 57) which is immediately received by the other interface circuits (rectangles 58) that hook on their line (59). The caller thus communicates only with the person (or the apparatus) that hooked off terminal 15.

The telephone system according to the invention permits devising a large number of other processes for exchanging information and implementing additional applications.

I claim:

1. A telephone system comprising several telephone terminals on a single telephone line comprised of several telephone interface circuits (6, 7, 8) arranged between the line (3) and each of the terminals (13, 14, 15, 16), each interface circuit comprising a first circuit (26) comprising means for counting a predetermined number of ringing signals (S1, S2) appearing on the line (L1-L2), means (I) for storing power from the ringing signals and means (III, 27, 28) for picking up the line after said predetermined number of ringing signals, said storing means energizing said counting means (II) and said picking up means.

2. A telephone system according to claim 1, wherein said storing means comprise a capacitor (C2) in series with a diode (D1).

3. A telephone system according to claim 1, wherein said storing means comprise, across the line terminals, a first capacitor (C1) in series with a first resistor (R1) and, in parallel with said first resistor, a second high value capacitor (C2) in series with a diode (D1) and a second resistor (R2), the junction of said second capacitor and said diode constituting the output (A) of said storing means.

4. A telephone system according to claim 1, wherein the counting means comprise a voltage offset circuit providing to a first output terminal (B) a voltage which abruptly increases at the end of each ringing signal and means (Z, T1) for threshold comparison.

5. A telephone system according to claim 3, wherein the voltage offset circuit comprises, between a wire (L1) of said line and said output (A) of the storing means, a third capacitor (C3) and a third resistor (R3); in parallel on the third resistor, a second diode (D2) and a fourth capacitor (C4) in series; and, in parallel on said fourth capacitor a fourth resistor (R4).

6. A telephone system according to claim 1, wherein each interface circuit comprises:
 a selection circuit (32) for, after picking up of the line, recognizing an additional determined call number (55) sent to the line by a caller; and
 a ringing tone (34) controlled by said selection circuit (32) when the latter has recognized the additional call number as the one corresponding to its terminal.

7. A telephone system according to claim 4, comprising a main interface circuit (6) and at least one secondary interface circuit (7, 8), the main interface circuit further comprising an answering circuit (31) comprising a vocal synthesizer activated once the line has been picked up for sending on the line speech signals to the caller asking him to dial one of the additional call numbers intended for one of the selection circuits.

8. A telephone system according to claim 1, wherein each interface circuit comprises means for:
 detecting the hooking off of the corresponding telephone terminal,
 emitting a determined frequency (57) in the line as soon as this telephone terminal is hooked off,
 detecting the presence of such a frequency (58) from another interface circuit, and
 disconnecting the line in response to the occurrence of this frequency;
 whereby, when one of the interface circuits detects the hooking off of the corresponding terminal, it sends the determined frequency to the line, thus causing all other interface circuits to be disconnected.

* * * * *